United States Patent
Fukutani et al.

(10) Patent No.: US 8,383,978 B2
(45) Date of Patent: Feb. 26, 2013

(54) STEEL PIPE MATERIAL WELD ZONE HEATING APPARATUS AND METHOD

(75) Inventors: Kazuhiko Fukutani, Tokyo (JP); Kenji Umetsu, Tokyo (JP); Yoshiaki Nakamura, Tokyo (JP); Kazuto Yamamoto, Tokyo (JP); Takashi Miyakawa, Tokyo (JP); Ryuichi Shimada, Tokyo (JP); Tadayuki Kitahara, Tokyo (JP); Takanori Isobe, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 362 days.

(21) Appl. No.: 12/734,442

(22) PCT Filed: Oct. 22, 2008

(86) PCT No.: PCT/JP2008/069582
§ 371 (c)(1),
(2), (4) Date: Apr. 30, 2010

(87) PCT Pub. No.: WO2009/060764
PCT Pub. Date: May 14, 2009

(65) Prior Publication Data
US 2010/0258535 A1 Oct. 14, 2010

(30) Foreign Application Priority Data
Nov. 5, 2007 (JP) .................................. 2007-287621

(51) Int. Cl.
B23K 11/24 (2006.01)

(52) U.S. Cl. ...................... 219/108; 219/117.1; 138/171

(58) Field of Classification Search .................. 219/108, 219/61.2, 117.1, 607, 608; 138/171
See application file for complete search history.

(56) References Cited

U.S. PATENT DOCUMENTS

| | | | | | |
|---|---|---|---|---|---|
| 3,573,416 | A | * | 4/1971 | Drechsler | 219/608 |
| 4,479,043 | A | * | 10/1984 | Hess et al. | 219/608 |
| 5,140,123 | A | * | 8/1992 | Mitani | 219/61.2 |
| 5,571,437 | A | * | 11/1996 | Rudd | 219/607 |
| 5,714,808 | A |  | 2/1998 | Ansel et al. |  |
| 5,841,094 | A | * | 11/1998 | Baumgartner | 219/81 |
| 6,933,479 | B2 | * | 8/2005 | Tanaka et al. | 219/619 |

FOREIGN PATENT DOCUMENTS

| | | |
|---|---|---|
| JP | 56-168981 | 12/1981 |
| JP | 61-17366 | 1/1986 |

(Continued)

OTHER PUBLICATIONS

Korean Office Action dated Nov. 15, 2011 issued in corresponding Korean Application No. 10-2010-7006164.

(Continued)

*Primary Examiner* — Tan T. Nguyen
(74) *Attorney, Agent, or Firm* — Kenyon & Kenyon LLP

(57) ABSTRACT

This invention provides a steel pipe material weld zone heating method and apparatus for melting and welding the weld zone of a steel pipe material that during continuous induction heating and welding of moving steel pipe material as the material being heated controls temperature distribution and molten steel shape and weld frequency fluctuation with high accuracy and high efficiency, irrespective of the shape of the heated region of material being heated or the material properties of the material being heated, which comprises a first imaging device, a weld zone temperature distribution computation device, a heating control device, and a variable frequency alternating current power supply device.

16 Claims, 8 Drawing Sheets

FOREIGN PATENT DOCUMENTS

| | | |
|---|---|---|
| JP | 61-135490 | 6/1986 |
| JP | 61-182887 | 8/1986 |
| JP | 03-001478 | 1/1991 |
| JP | 4-274887 | 9/1992 |
| JP | 06-124775 | 5/1994 |
| JP | 08-507170 | 7/1996 |
| JP | 8-206852 | 8/1996 |
| JP | 11-58031 | 3/1999 |
| JP | 11-156434 | 6/1999 |
| JP | 2003-243136 | 8/2003 |
| JP | 2004-127854 | 4/2004 |
| JP | 2004-260991 | 9/2004 |
| JP | 2007-237241 | 9/2007 |

OTHER PUBLICATIONS

International Search Report dated Feb. 3, 2009 issued in corresponding PCT Application No. PCT/JP2008/069582.

* cited by examiner

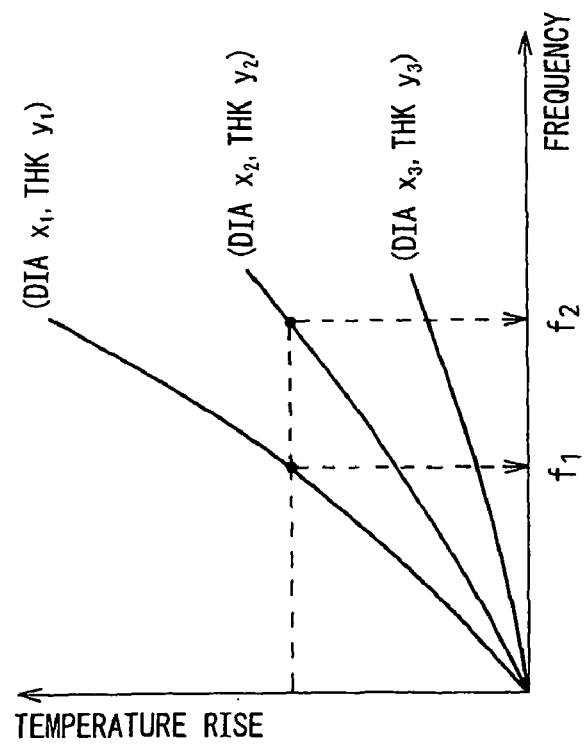
Fig.4(a) ⟨STEEL TYPE A⟩
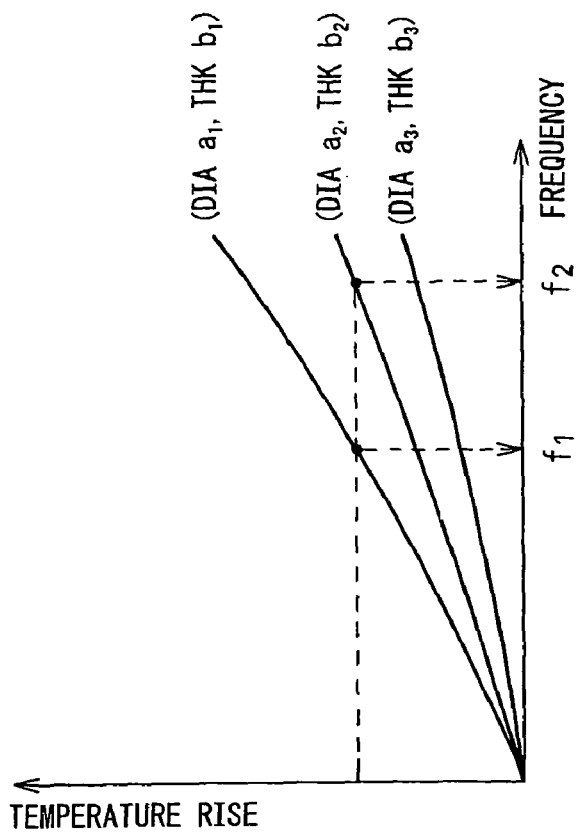
Fig.4(b) ⟨STEEL TYPE B⟩

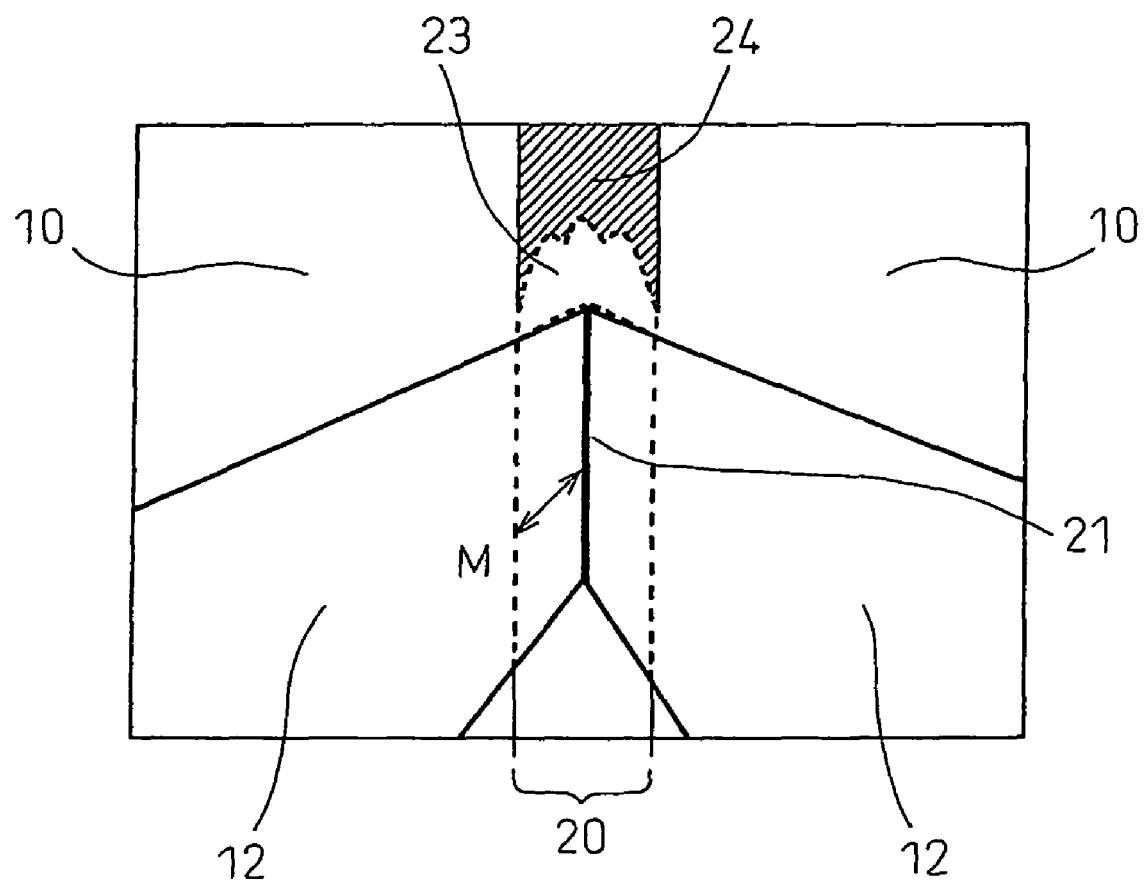

STEEL PIPE MATERIAL WELD ZONE HEATING APPARATUS AND METHOD

This application is a national stage application of International Application No. PCT/JP2008/069582, filed 22 Oct. 2008, which claims priority to Japanese Application No. 2007-287621, filed 5 Nov. 2007, which is incorporated by reference in its entirety.

TECHNICAL FIELD

This invention relates to a technology for continuously heating a weld zone by electromagnetic induction or direct supply of electric power, where the material to be heated is a moving steel pipe material. It particularly relates to a heating apparatus and method suitable for heating that realize the desired values of the weld zone temperature distribution, shape of the molten weld zone, and weld frequency fluctuation during welding, irrespective of the shape or material properties of the heated material.

BACKGROUND ART

In electric resistance heating, the material being heated is heated by joule heat produced by electric current generated in the metal material that is the material being heated and the resistivity of the material being heated. As such, electric resistance heating is viewed as a clean heating method and used particularly in the steel industry but also widely throughout the industrial sector. Electric resistance heating includes one method in which an alternating magnetic flux generated from an electromagnetic coil by passing alternating exciting current through the electromagnetic coil is applied to the material being heated to produce induced current in the material being heated (here called the induction heating method) and another method in which contacts (two electrodes) are brought in contact with the material being heated to directly apply electric current (here called the direct electrical heating method).

As indicated by Equation (1), the frequency of the alternating magnetic flux generated from the electromagnetic coil in the induction heating method or of the electric current directly applied in the direct electrical heating method determines the depth from the surface of the material being heated to which the current passes through the material being heated (penetration depth: δ). Therefore, in order to heat the material being heated to the desired temperature distribution, it is necessary to set the frequency of the current at an appropriate value in view of the diameter, thickness and other aspects of the shape of the material being heated and its electromagnetic property value. Of particular note, is that steel pipe material of ordinary ferromagnetic material has a relative permeability μγ considerably larger than 1 (e.g., 10 to 1000) so that the penetration depth δ strongly depends on frequency change.

$$\delta \propto \{\rho/(\mu\gamma \cdot f)\}^{1/2} \qquad <1>$$

where ρ: resistivity of the heated material, relative permeability of the heated material, and f: frequency of the alternating magnetic flux or directly applied electric current.

In this connection, when the electromagnetic coil for induction heating is excited with a heating power supply, the usual practice is to configure a resonant circuit of a capacitor (capacitance: C) connected as disposed in parallel or series with the electromagnetic coil and to apply current at a frequency near the resonant frequency (f) expressed by Equation <2> (see, for example, Japanese Patent Publication (A) 2004-127854 and Japanese Patent Publication (A) H03-1478).

$$f=1/\{2\pi(L \cdot C)^{1/2}\} \qquad <2>,$$

where L means the electromagnetic property value of the heated material, which in the case of the induction heating method is the inductance of the coil system determined by aspects of the coil configuration such as the number of coil winds and dimensions of the electromagnetic coil and the positional arrangement of the electromagnetic coil and material being heated.

Moreover, in order to excite the resonant circuit with good energy efficiency, an impedance matcher for power factor improvement is sometimes installed between the resonant circuit and the heating power supply (see, for example, Japanese Patent Publication (A) 2004-127854, Japanese Patent Publication (A) H03-1478, and Japanese Patent Publication (A) H06-124775).

Patent Publication (A) H03-1478 and Patent Publication (A) H06-124775 teach techniques for performing heating by a method of in advance determining and fixing an appropriate frequency for the thickness, width, steel type and other property and shape aspects of the material to be heated. Patent Publication (A) H03-1478 teaches a high-frequency induction heating device for local annealing of steel pipe and the like, which is an inverter type power supply that enables the frequency of the exciting current to be preset for the electromagnetic coil shape and the like and is not damaged during overload. Patent Publication (A) H06-124775 teaches an inverter-type high-frequency induction heating device for pre-heating or post-heating in butt-welding of steel pipe material and the like, in which multiple electromagnetic coils are provided at the weld zone and the multiple electromagnetic coils are switched to efficiently pass high-frequency current.

In a production line for steel pipe or the like, in order to achieve uniform quality as regards the strength and other material properties of the weld zone and its vicinity, the heating and continuous welding of the weld zone of the heated material while the steel pipe material or other heated material is being conveyed through an induction heating device using an electromagnetic coil or a direct electrical heating device using contacts must be conducted so as to impart the desired shapes/values to the temperature distribution in the direction of weld zone thickness, the shape of the molten weld zone, and the weld frequency fluctuation during welding.

However, during inductance heating of the material to be heated, the inductance L changes greatly with variation in the shape and material properties of the material being heated. Further, differences in the shape of the heated material change the way the heating current flows, which greatly changes not only the heat generation rate and distribution of the heat at the weld zone but also the resulting thickness-direction temperature distribution of the weld zone, shape of the molten weld zone, and weld frequency fluctuation during welding.

SUMMARY OF THE INVENTION

In this connection, as regards the power supplies set out in the aforesaid Patent Publication (A) 2004-127854 and Patent Publication (A) H03-1478, since the temperature of the material being heated is regulated by controlling the exciting voltage of the heating coil or the voltage of the contacts and, as pointed out above, the induction of the electromagnetic coil system consisting of the heated material and the electromagnetic coil varies, impedance matching is implemented by installing a high-frequency transformer between the heating power supply and the electromagnetic coil. However, regulation is difficult during current application, while the fact that regulation must be conducted for every thickness, width and steel type of the material being heated has also been a problem. Moreover, the installation of the high-frequency transformer degrades heating efficiency. And when the aforesaid resonant circuit configuration is adopted, it is necessary, as indicated by Equation <2>, to make the matching capacitor (C) variable with respect to the different frequencies f. However, the matching capacitor is very difficult to adjust during heating, which poses a problem of it being difficult during continuous induction heating of the heated material to vary the exciting frequency in response to changes in the diameter, thickness and other shape aspects of the heated material and in its physical properties.

On the other hand, regarding the method for varying the frequency of the current applied to the electromagnetic coil, Patent Publication (A) 2004-127854 teaches an induction heating device technology wherein the heating coil is divided into multiple element coils and the frequency is varied by selecting the frequency of the applied current separately for each element coil. However, the need for a power supply unit for each element coil has been a problem because it increases the cost of installing the heating device.

In view of the aforesaid problems of the prior art, the present invention has a first object of, during continuous heating and welding of steel pipe material as the material being heated, establishing the temperature distribution of the weld zone with higher accuracy and higher efficiency than heretofore, thereby realizing excellent weld quality irrespective of the shape of the material being heated or of the material properties of the material being heated, and a second object and a third object of controlling the shape of the molten weld zone and the welding frequency fluctuation during welding, respectively.

(1) The steel pipe material weld zone heating apparatus of the present invention is a steel pipe material weld zone heating apparatus that, in making a tubular steel pipe material while bending a moving steel plate into cylindrical shape, uses a variable frequency alternating current power supply, whose frequency is variable within a predetermined frequency range, to generate joule heat by passing alternating current near end faces of the steel pipe material to continuously melt and pressure-weld a weld zone of the steel pipe material, which is characterized in comprising: first imaging means installed opposite an end face weld zone of the steel pipe material that detects self-emitted light of the weld zone and outputs a brightness image; a weld zone temperature distribution computation means that performs image processing based on the brightness image and applies emitted light temperature measurement to compute the plate-thickness direction temperature distribution of the weld zone; heating control means that, by use of a criterion predefined from the dimensions and electromagnetic properties of the steel pipe material for evaluating the relationship between alternating current frequency and plate-thickness direction temperature distribution, determines the frequency of the alternating current based on the plate-thickness direction temperature distribution; and a variable frequency alternating current power supply for passing through the steel pipe material alternating current of the frequency determined by the heating control means.

(2) It is also characterized in that the aforesaid steel pipe material weld zone heating apparatus further comprises: second imaging means that images the weld zone of the steel pipe material from above and outputs a plane image of the molten steel material immediately after pressure-welding the steel pipe material; and weld zone melt shape measurement means that ascertains the melt shape based on the plane image and outputs a molten zone width value, wherein the heating control means, by use of a predefined criterion for evaluating the molten zone width and the criterion for evaluating the relationship between the alternating current frequency and the plate-thickness direction temperature distribution, determines the frequency of the alternating current based on the molten zone width value and the plate-thickness direction temperature distribution.

(3) It is also characterized in that the aforesaid steel pipe material weld zone heating apparatus further comprises: welding current waveform measurement means that measures the current waveform of the alternating current; and welding frequency fluctuation measurement means that, based on a current waveform output by the welding current waveform measurement means, ascertains and outputs a welding frequency time-dependent fluctuation value that is the time-dependent fluctuation amplitude of the current waveform frequency, wherein the heating control means further compares the welding frequency time-dependent fluctuation value with a predetermined allowable value and determines the frequency of the alternating current.

(4) It is also characterized in that the aforesaid steel pipe material weld zone heating apparatus further comprises: a heating electromagnetic coil that is installed in the outer circumferential direction of the steel pipe material to be substantially coaxial with the steel pipe material and is supplied with exciting current from the variable frequency alternating current power supply to perform heating by inducing the alternating current in the steel pipe material.

(5) Moreover, the heating control means can be configured to determine the frequency and current value of the exciting current of the heating electromagnetic coil and control the variable frequency alternating current power supply.

(6) In addition, the steel pipe material weld zone heating apparatus can be equipped with a pair of direct electrical heating contacts installed on opposite ends of the steel plate across the weld zone from each other as electrodes that apply alternating current from the alternating current power supply.

(7) Moreover, the heating control means can be configured to determine the frequency and current value of the alternating current supplied to the direct electrical heating contacts and control the variable frequency alternating current power supply.

(8) In addition, the variable frequency alternating current power supply can be a magnetic energy recovery type alternating current power supply and its frequency can be made continuously or discretely variable.

(9) The steel pipe material weld zone heating method of the present invention is a steel pipe material weld zone heating method that, in making a tubular steel pipe material while bending a moving steel plate into cylindrical shape, uses a variable frequency alternating current power supply, whose frequency is variable within a predetermined frequency range, to generate joule heat by passing alternating current near end faces of the steel pipe material to continuously melt and pressure-weld a weld zone of the steel pipe material, which is characterized in comprising: a first imaging step in which first imaging means installed opposite an end face weld zone of the steel pipe material is used to detect self-emitted light of the weld zone and output a brightness image; a weld zone temperature distribution computation step in which image processing is performed based on the brightness image and emitted light temperature measurement is applied to compute the plate-thickness direction temperature distribution of the weld zone; a heating control step in which a criterion predefined from the dimensions and electromagnetic properties of the steel pipe material for evaluating the relationship between alternating current frequency and plate-thickness direction temperature distribution is used to determine the frequency of the alternating current based on the plate-thickness direction temperature distribution; and a step in which the variable frequency alternating current power supply is used to pass through the steel pipe material alternating current of the frequency determined in the heating control step.

(10) It is also characterized in that the aforesaid steel pipe material weld zone heating method further comprises: a second imaging step of using second imaging means to image the weld zone of the steel pipe material from above and output a plane image of molten steel material immediately after pressure-welding the steel pipe material; and a weld zone melt shape measurement step of ascertaining the melt shape based on the plane image and outputting a molten zone width value, wherein the heating control step, by use of a predefined criterion for evaluating the molten zone width and the criterion for evaluating the relationship between the alternating current frequency and the plate-thickness direction temperature distribution, determines the frequency of the alternating current based on the molten zone width value and the plate-thickness direction temperature distribution.

(11) It is also characterized in that the aforesaid steel pipe material weld zone heating method further comprises: a welding current waveform measurement step of measuring the current waveform of the alternating current; and a welding frequency fluctuation measurement step of, based on a current waveform output in the welding current waveform measurement step, ascertaining and outputting a welding frequency time-dependent fluctuation value that is the time-dependent fluctuation amplitude of the current waveform frequency, wherein the heating control step further compares the welding frequency time-dependent fluctuation value with a predetermined allowable value and determines the frequency of the alternating current.

(12) It is also characterized in that, in the aforesaid steel pipe material weld zone heating method, exciting current from the variable frequency alternating current power supply is supplied to a heating electromagnetic coil installed in the outer circumferential direction of the steel pipe material to be substantially coaxial with the steel pipe material, thereby performing heating by inducing the alternating current in the steel pipe material, or heating is performed by passing the alternating current through the steel pipe material using direct electrical heating contacts installed on opposite ends of the steel plate across the weld zone from each other for applying alternating current from the alternating current power supply.

(13) Moreover, it is possible in the heating control step to determine the frequency and current value of the exciting current of the heating electromagnetic coil and control the variable frequency alternating current power supply or to determine the frequency and current value of the alternating current supplied to the direct electrical heating contacts and control the variable frequency alternating current power supply.

(14) In addition, it is possible in the aforesaid steel pipe material weld zone heating method for the variable frequency alternating current power supply utilized to be a magnetic energy recovery type alternating current power supply and for its frequency to be made continuously or discretely variable.

(15) The steel pipe of the present invention is characterized in that it is produced by the aforesaid steel pipe material weld zone heating apparatus or weld zone heating method.

BRIEF DESCRIPTION OF THE DRAWINGS

FIG. 4(a) is a schematic diagram showing the relationship between frequency and temperature rise pattern in a mode of carrying out the present invention, indicating the case of steel type A.

4(b) is a schematic diagram showing the relationship between frequency and temperature rise pattern in a mode of carrying out the present invention, indicating the case of steel type B.

Figure 5:
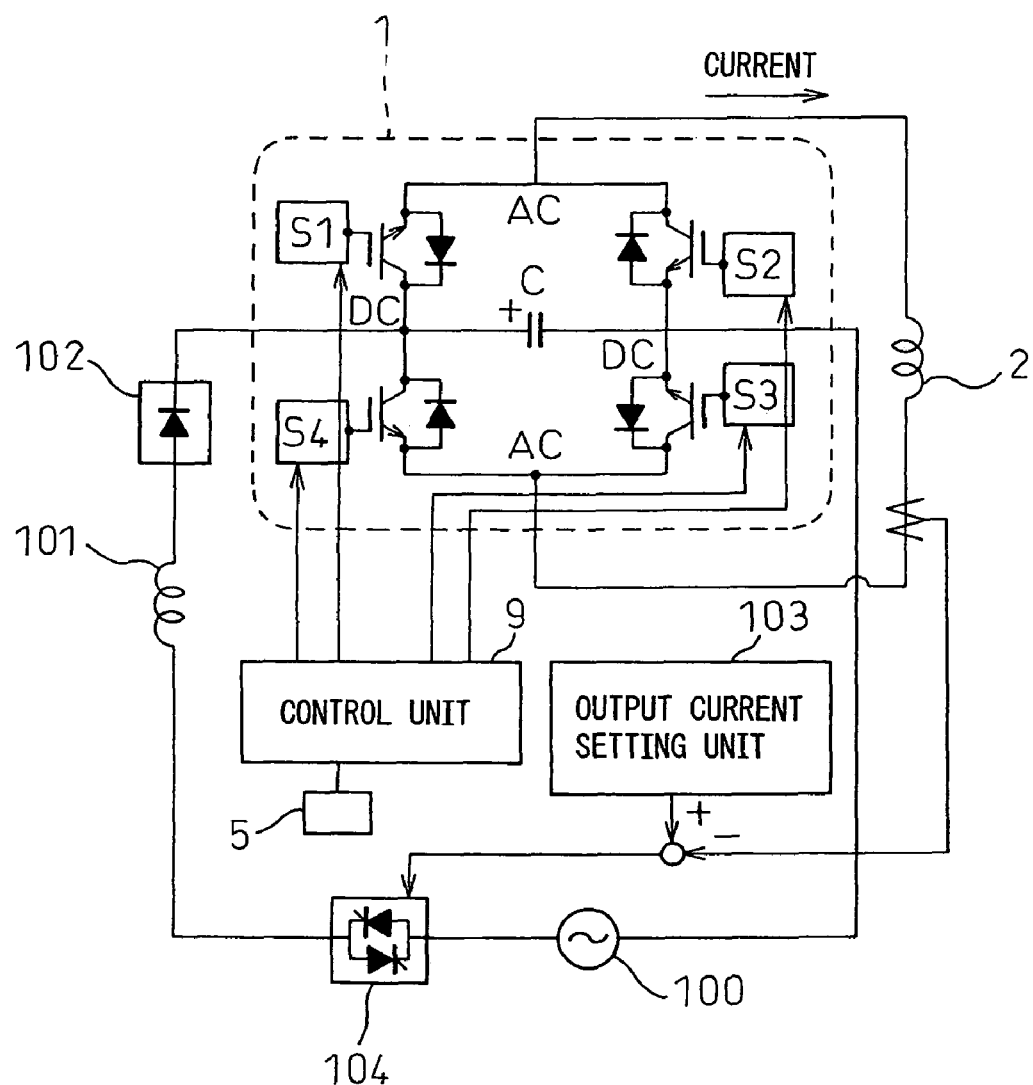

FIG. 5 is an example of a variable frequency power supply in a mode of carrying out the present invention.

FIG. 6 is a perspective schematic diagram of the weld zone of a steel pipe in the present invention.

Figure 7A:
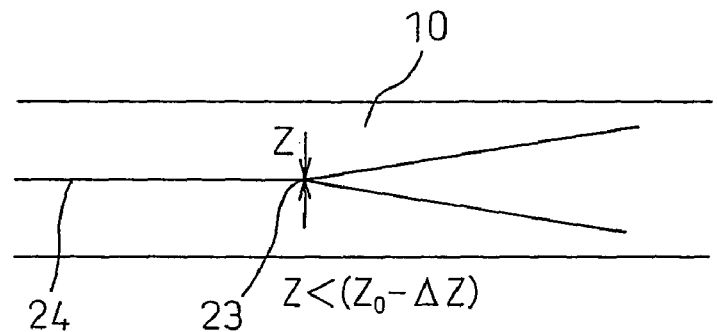

FIG. 7(a) is a schematic diagram for explaining the melt shape immediately after welding the steel pipe in the present invention, indicating the case of $Z<(Z_o-\Delta Z)$.

Figure 7B:
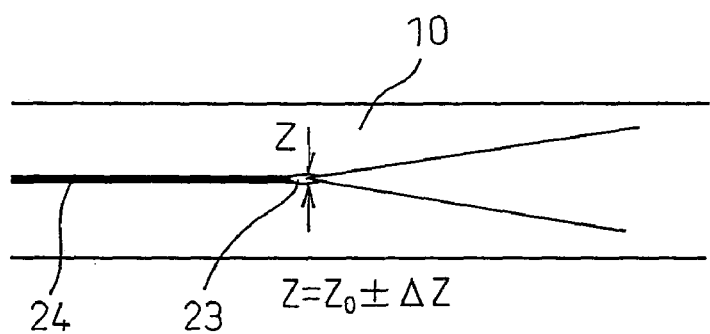

FIG. 7(b) is a schematic diagram for explaining the melt condition immediately after welding the steel pipe in the present invention, indicating the case of $Z=(Z_o\pm\Delta Z)$.

Figure 7C:
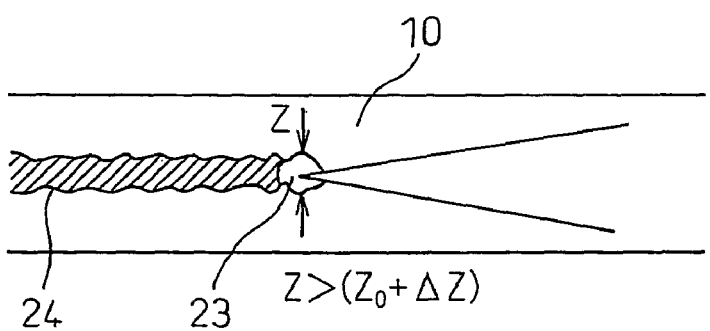

FIG. 7(c) is a schematic diagram for explaining the melt condition immediately after welding the steel pipe in the present invention, indicating the case of $Z>(Z_o+\Delta Z)$.

BEST MODES FOR CARRYING OUT THE INVENTION

Preferred modes for carrying out the present invention are explained below with reference to the drawings. Note that in the specification and drawings, constituent elements having substantially the same function and configuration are assigned like symbols to avoid redundant explanation.

As indicated by Equation <1>, when a steel pipe is heated as the material being heated, the penetration depth $\delta$ is changed either by changing the frequency of the alternating magnetic flux generated by the exciting coil or by changing the frequency when conducting direct electrical heating, thereby making it possible to change the amount of heat generated in the thickness direction of the material being heated. As regards the desired amount of heat, it suffices to define the applied power and the penetration depth $\delta$ and apply exciting current of the frequency determined by Equation <1> to the electromagnetic coil or the contacts. The present invention is a technique that highly accurately controls the heat of the steel pipe material weld zone and the distribution thereof by focusing on this point.

Modes of carrying out the present invention will be explained in detail using the drawings, taking as an example the heating method and heating apparatus for a heated material that is a steel pipe material moving through a steel pipe production line. Note that for easy understanding the same symbols are used to indicate the same items throughout the drawings.

Figure 1A:
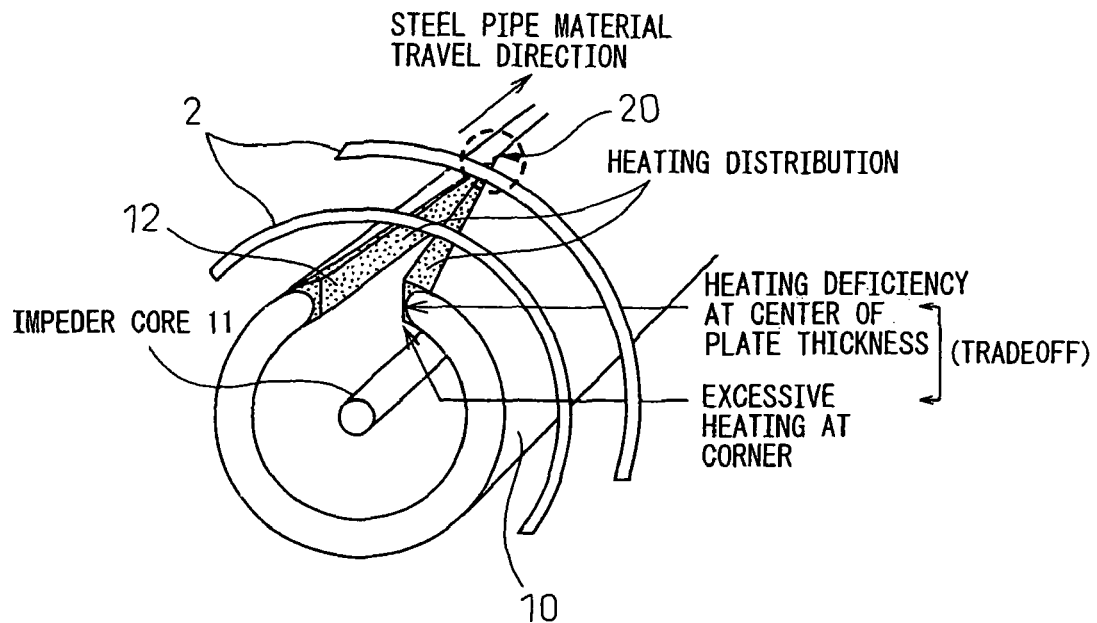
FIG. 1(a) is a schematic diagram of the arrangement of an induction-heating type steel pipe material heater.
Figure 1B:
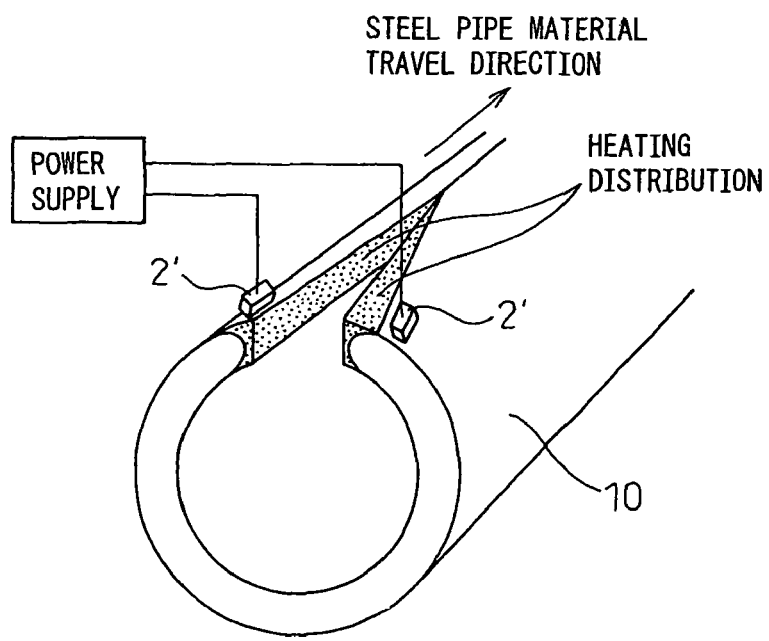
FIG. 1(b) is a schematic diagram of the arrangement of a direct electrical heating type steel pipe heater.

FIG. 1 gives an overview of examples of electromagnetic welding of welded steel pipe in a steel pipe production process using steel pipe material as the heated material. Here, FIG. 1(a) is a schematic diagram of the configuration when heating the material to be heated by the induction heating method, and FIG. 1(b) is a schematic diagram of the configuration when heating the material to be heated by the direct electrical heating method First Embodiment In the following, a weld zone heating apparatus when adopting the induction heating method of FIG. 1(a) will be explained first as a first embodiment. In this embodiment, a steel plate of thickness t constituting a steel pipe material moving in its longitudinal direction in the production line is progressively bent in its lateral direction and formed into tubular shape using rolls, and the end faces 12 of the opposite bent sides are heated and continuously welded progressively from the end. A heating electromagnetic coil 2 is installed so that its winding lies substantially parallel to the outer circumferential direction of the pipe 10, i.e., so as to be substantially coaxial with the pipe 10, and an impeder core 11 that is a ferromagnet of large relative permeability is installed inside the pipe 10 in the longitudinal direction of the steel pipe, thereby enhancing heating efficiency by reducing leakage to the outside of the alternating magnetic flux generated by the alternating current passing through the heating electromagnetic coil 2. An alternating magnetic flux is generated by using an exciting power supply to pass alternating current of a predetermined frequency through the heating electromagnetic coil 2 and the alternating magnetic flux generates induced current in the pipe 10. A weld zone 20 of the pipe 10 is melted by heating to above a predetermined temperature, and the end faces are pressed together and welded by a pressure welding machine (not shown) installed downstream of the weld zone heating apparatus. FIG. 6 is a perspective diagram showing an overview of the weld zone and its vicinity when viewed at an angle from the travel direction of the steel pipe. The left and right end faces of the steel plate are pressure-welded at a junction line 21. In other words, as viewed at the surface of the steel pipe, the heated material (steel plate) 10 is made into a steel pipe by forcing it into contact from the left and right with the weld zone in between. The weld zone 20 is the region of the edges straddling the junction line, whose length on one side is defined as M.

When the penetration depth of the induced current owing to the surface effect in response to the alternating current is shallow, the temperature distribution in the weld zone plate thickness direction of the pipe 10 becomes a temperature distribution wherein the temperature at the center of plate thickness is lower than the temperature at the plate-thickness front and rear surfaces of the steel plate. Moreover, the penetration depth of the induced current passing through the pipe 10 differs depending on the diameter, thickness and material properties of the pipe 10, thus making the temperature distribution of the induction-heated steel material different, whereby the shape of the molten portion of the steel material of the weld zone, i.e., the melt shape, becomes different. When a steel pipe material having such a plate thickness direction temperature distribution and melt shape is pressure-welded by the pressure welding machine (not shown) installed rearward of the weld zone, weld defects such as the following may occur owing to difference in melt shape and melt shape fluctuation. Namely, the molten condition of the steel material fluctuates in the thickness direction owing to the difference in the frequency of the alternating current passed through the heating electromagnetic coil 2, so that, for example, when heating is conducted under heating conditions for properly establishing the temperature and melt shape at the center of plate thickness of the pipe 10, the temperature at the plate-thickness front and rear surface regions becomes higher than the prescribed value so that excessive melting occurs, while to the contrary, when heating is conducted under heating conditions for properly establishing the temperature and melt shape at the plate-thickness front and rear surface regions, temperature deficiency and melting failure occur at the center of plate thickness, which impairs weld zone quality, thus causing steel pipe production problems and giving rise to materials of unacceptable quality.

Figure 2A:
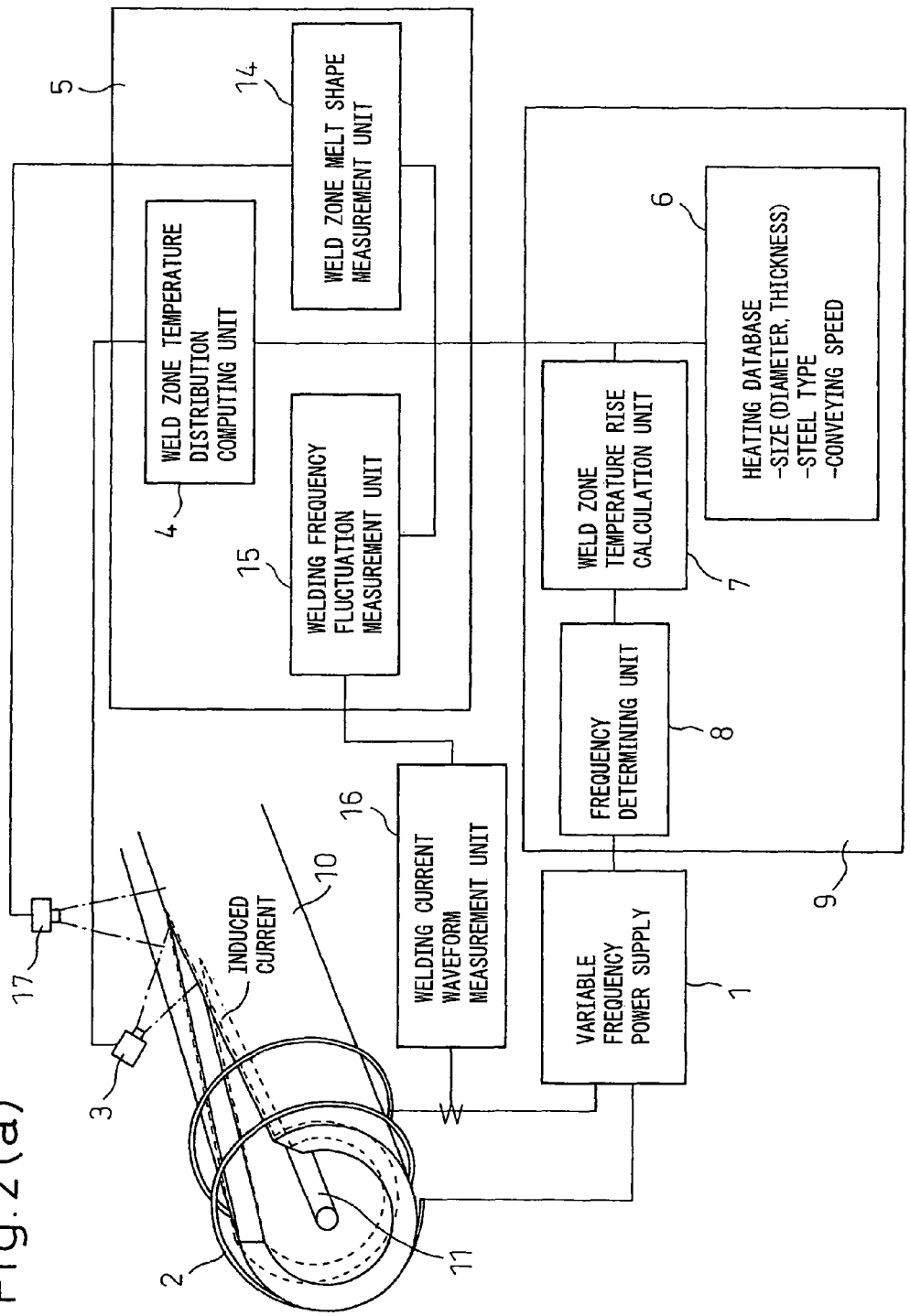
FIG. 2(a) is a schematic diagram of an induction-heating type steel pipe material weld zone induction-heating apparatus in a mode of carrying out the present invention.

A schematic diagram of the induction-heating type steel pipe material weld zone heating apparatus of this embodiment is shown in FIG. 2(a). As shown in FIG. 2(a), the heating apparatus comprises the heating electromagnetic coil 2 installed outside the pipe 10 to enclose the pipe 10 in the longitudinal direction, a variable frequency power supply 1 for exciting the heating electromagnetic coil 2, whose frequency is continuously variable within a predefined frequency range, a first weld zone imaging unit 3 installed downstream of the heating electromagnetic coil 2 step and obliquely above the weld zone of the pipe 10 for imaging the brightness distribution owing to self-emitted light in the plate thickness direction at the weld zone of the pipe 10 and taking frame images such as shown in FIG. 6, a weld zone temperature distribution computation unit 4 for image-processing weld zone plate thickness direction brightness distribution images output from the first weld zone imaging unit 3 and utilizing radiation thermometry to output weld zone two-dimensional temperature distribution whose axes lie in the weld zone thickness direction of the weld zone and the steel material longitudinal direction, a second weld zone imaging unit 17 installed above the weld zone for taking images (plane images) of the weld zone as seen from above (above the steel material surface), a weld zone melt shape measurement unit 14 for deriving the melt shape of the weld zone as seen from above based on the plane image output from the second weld zone imaging unit 17 and outputting it as a measured melt shape value, a welding frequency fluctuation measurement unit 15 for signal-processing a welding current waveform of the exciting current of the heating electromagnetic coil 2 output from a welding current waveform measurement unit 16 and outputting the exciting current frequency (welding frequency value: Fo) and its fluctuation amplitude (:ΔFo), and a heating control unit 9 for controlling the variable frequency power supply 1 to regulate the exciting current so that the temperature distribution and melt shape in the plate thickness direction of the weld zone of the pipe 10, and the welding frequency, assume predefined condition values.

Note that the weld zone temperature distribution computation unit 4, welding frequency fluctuation measurement unit 15, and weld zone melt shape measurement unit 14 are collectively called a welding condition measurement unit 5. Further, the welding current waveform measurement unit 16 can be constituted as a resistor, current probe or other current detection sensor provided in series with wiring connecting the variable frequency power supply 1 and the heating electromagnetic coil 2.

<1. Control of Exciting Current Based on Temperature Distribution in the Weld Zone Plate Thickness Direction>

Figure 3:
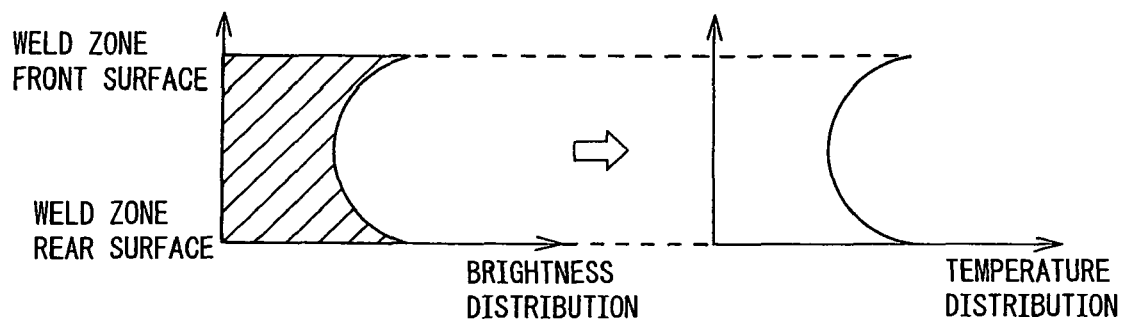
FIG. 3 is a schematic view of plate-thickness direction temperature distribution (brightness distribution) of a molten zone.

The first weld zone imaging unit 3 is an example of the first imaging means, and as the first weld zone imaging unit 3 it is possible to use, for example, a high-resolution camera such as a commercially available CCD camera, namely a high-resolution camera that is housed in a magnetic shielding case and acquires the two-dimensional brightness distribution in the weld zone plate thickness direction and the longitudinal direction of the steel plate end faces as a frame image like that shown in FIG. 6 (first imaging step). The brightness distribution and temperature distribution with respect to one dimension (weld zone plate thickness direction) are shown in FIG. 3. The brightness distribution image output from the first weld zone imaging unit 3 is image-processed by the weld zone temperature distribution computation unit 4, which is an example of the weld zone temperature distribution computation means, to extract the weld zone, and the brightness is converted to temperature, pixel by pixel for example, by radiation thermometry, a conventional technology, to obtain a weld zone two-dimensional temperature distribution of the temperature distribution in the plate thickness direction of the weld zone and the steel plate longitudinal direction (temperature distribution measurement step, weld zone temperature distribution computation step).

Note that while the aforesaid weld zone two-dimensional temperature distribution can be used as the temperature distribution of the weld zone for evaluating the pass/fail thereof, it is also possible to take the length M of the weld zone 20 shown in FIG. 6 as, for example, 10 mm, average in the longitudinal direction of the steel plate at this portion to calculate a one-dimensional sheet thickness direction temperature distribution such as shown in FIG. 3, and evaluate its pass/fail. Although the following explanation is made taking one-dimensional plate thickness direction temperature distribution as an example, substantially the same pass/fail evaluation can obviously also be implemented in the two-dimensional case.

In the weld zone of the pipe 10, the alternating magnetic flux generated by the exciting current passing through the heating electromagnetic coil 2 produces induced current at the front and rear surfaces of the steel pipe as schematically indicated by the broken lines in FIG. 2(a). The weld zone of the pipe 10 is heated by joule heat produced by this induced current and the resistance of the pipe 10. Here, as indicated by Equation <1>, the penetration depth of the induced current in the plate thickness direction of the steel pipe varies with the frequency of the alternating magnetic flux owing to the current passing through the heating electromagnetic coil 2 and the electromagnetic properties attributable to the steel pipe size (diameter, thickness) and steel type (composition and structure). In this embodiment, the penetration depth of the induced current passing through the pipe 10 is controlled by dynamically controlling the frequency of the current passing through the heating electromagnetic coil 2 in accordance with the steel pipe dimensions/size (diameter, thickness), material properties (composition, structure), and electromagnetic properties.

The heating control unit 9 shown in FIG. 2(a) is an example of the heating control means and comprises the weld zone temperature rise calculation unit 7 that uses the frequency f of the exciting current as a variable to calculate the temperature rise in the plate thickness direction of the weld zone based on the steel pipe size (diameter, thickness), steel type, steel pipe travel speed and other production data stored beforehand in the heating database 6 (including the production schedule, i.e., the order of the production lots, and the individual lot production conditions) and the frequency determining unit 8 that calculates the frequency of the exciting current using the exciting current frequency (welding frequency value: Fo) input from the welding frequency fluctuation measurement unit 15, the weld zone one-dimensional temperature distribution output by the weld zone temperature distribution computation unit 4, and the derivation result of the weld zone temperature rise calculation unit 7 (heating control step).

The frequency determining unit 8 can be configured to determine not only the frequency but also concomitantly the amperage and/or voltage of the current applied to the heating electromagnetic coil 2. In this embodiment, explanation will be made regarding the case where the current amperage (amplitude) is preset to an appropriate value that experimentally enables heating of the weld zone to a prescribed temperature region.

Next, the internal configuration of the heating control unit 9 will be explained.

The relationship between the frequency of the alternating exciting current (alternating current) and the temperature rise pattern is determined for the production conditions consisting of the size (diameter, thickness) and steel type (electrical resistance etc.) of the steel pipe actually passing through the production process, either experimentally in advance or by determining the electromagnetic induction phenomenon in response to the alternating exciting current by weld zone heating simulation using electromagnetic field calculation (calculation by FEM or the like) and heat transfer model calculation and is stored in the weld zone temperature rise calculation unit 7 in the form of a table as one example of criterion. For example, if the electrical resistance of the steel material, which ordinarily varies with temperature, is assumed to be a fixed electrical resistance, and weld zone heating is simulated with focus solely on the steel pipe size (diameter, thickness), curves like those in FIG. 4(a) and FIG. 4(b) can be obtained that represent the relationship between excitation frequency and temperature rise, with combinations of steel pipe diameter and thickness (diameter, thickness) as parameters. The temperature rises (assuming normal temperature as the base temperature) in the case of steel type A and steel type B exemplified in FIG. 4(a) and FIG. 4(b) are the results of simulation at the weld zone front surface (steel plate front surface), but N number of points, for instance, are selected in the plate thickness direction and designated P0, P1, ..., Pn in order from the surface, and the temperature rises T at these points of the steel type A or steel type B under production (Pn, f) (where f is the excitation frequency) are individually determined by weld zone heating simulation and stored in the weld zone temperature rise calculation unit 7.

In the frequency determining unit 8 which actually determines the frequency f of the exciting current, the frequency f is determined from the weld zone one-dimensional temperature distribution (one example of plate thickness direction temperature distribution) output by the weld zone temperature distribution computation unit 4, by regression calculation or other optimization computation based on the measured temperature values DT (Pn, f) at the respective points P0, P1 ..., Pn in the plate thickness direction and the temperature rise T (Pn, f) curves stored in the weld zone temperature rise calculation unit 7, so as to minimize the evaluation coefficient J represented by Equation <3>.

$$J = \frac{1}{n} \times \sum_{m=0}^{n} [DT(Pm, f) - T(Pm, f)]^2 \quad <3>$$

Aside from the method explained above of determining the frequency of the exciting current by presetting the relationship between the frequency of the alternating exciting current and the temperature rise pattern and then performing optimization calculation, the following method is also possible. Namely, it sometimes happens in the production process that a number of steel pipes of the same specifications are welded by induction heating, so that it is possible to provisionally define the relationship between the temperature rise and the associated frequency in the steel pipe welded at the beginning of the production and to give the frequency determining unit 8 learning capability by which it adjusts the relationship concerned to achieve the desired temperature and melt shape while separately monitoring, judging pass/fail, and learning the temperature distribution and melt shape resulting from the induction heat welding of the steel pipe.

<2. Exciting Current Control Based on Melt Shape>

The weld zone melt shape measurement unit 14 is an example of the weld zone melt shape measurement means, and, based on the plane image of the molten steel material immediately after pressure welding that is output by the second weld zone imaging unit 17, which is an example of the second imaging means (second imaging step), performs image processing to discriminate/detect the molten zone 23 in the plane image from brightness. Further, it is possible for it to discriminate/detect the molten zone 23 after determining the temperature distribution based on the brightness (weld zone melt shape measurement step). Note that the location at which this molten zone 23 cools and solidifies becomes the weld seam 24 shown in FIG. 6. Therefore, the width of the molten zone 23 is substantially the same as the width of the weld seam 24.

Specific shapes of the melt shape measured by the weld zone melt shape measurement unit 14 are shown in FIG. 7. In FIG. 7(*a*), the molten zone 23 immediately after pressure welding is of a width (Z) smaller than a desired value (Zo±ΔZ), which is an example of a predefined evaluation criterion of the weld zone width, and is in an unmelted state, so the heat input is increased by increasing the welding frequency to increase the induced current at the plate-thickness front and rear surfaces of the weld zone 20 of the pipe 10, or by increasing the input current. On the other hand, in FIG. 7(*c*), the molten zone 23 immediately after pressure welding is of a width (Z) greater than the desired value (Zo±ΔZ) and is in an excessively melted state, so the heat input is decreased by decreasing the welding frequency to increase the induced current at the plate-thickness center region of the weld zone 20 of the pipe 10, or by decreasing the input current. In other words, the frequency determining unit 8 adjusts and controls the frequency of the exciting current (welding frequency value: Fo) input from the welding frequency fluctuation measurement unit 15 so as to establish the good melt shape shown in FIG. 7(*b*). Here, the welding frequency control input or input current control input that satisfies the desired value (Zo±ΔZ) of the molten zone width immediately after pressure welding is a value that differs depending on the steel pipe size (diameter, thickness) and the steel type (composition, structure), so it is determined in advance, experimentally or by the aforesaid weld zone heating simulation, and stored in the heating database 6. Note that the production schedule consisting of type data for the steel pipe/steel material welded in the production process (including size (diameter, thickness) and steel type (composition, structure)) are also recorded in the heating database 6 in advance (continuation of the heating control step).

Note that when, based on the melt shape measured by the weld zone melt shape measurement unit 14, the melt shape is markedly large or small, it is possible to deem that welding abnormality has occurred and issue a warning by sounding an alarm or displaying a warning on a display screen.

<3. Exciting Current Control Based on Weld Frequency Fluctuation>

In this connection, although one prior art method fixes the frequency of the exciting current and configures the exciting power supply and the exciting coil via an impedance matching circuit, it is known that in this case the welding frequency fluctuates with change in the melt shape of the weld zone. In this embodiment, by utilizing this fact, the welding current waveform measurement unit 16, which is an example of the welding current waveform measurement means, and the welding frequency fluctuation measurement unit 15, which is an example of the welding frequency fluctuation measurement means, monitor welding frequency fluctuation (welding current waveform measurement step), thereby making it possible for shape change to be more exactly ascertained and exploited as an effective heating control indicator for obtaining good welding quality.

Although the weld frequency fluctuation can be suppressed by controlling the melt shape to the desired shape, the amount of weld frequency fluctuation also differs in value depending on the steel pipe size (diameter, thickness) and steel type (composition, structure), so that more highly accurate welding quality control is attained by storing in the heating database 6 a threshold D (example of the allowable value) for the welding frequency fluctuation measurement value (ΔFo) measured by the welding frequency fluctuation measurement unit 15 that is defined in advance for each of the steel pipe size (diameter, thickness) and steel type (composition, structure), and comparing the threshold D with the welding frequency fluctuation measurement value (ΔFo) in the frequency determining unit 8, as an indicator when implementing the weld shape control of the weld zone. For example, when the welding frequency fluctuation measurement value (ΔFo) becomes larger than the threshold D, the width of the molten zone 23 is considered to have become too large, so the frequency is lowered by a preset ratio (e.g., 30%).

In the foregoing was explained the following conducted by the frequency determining unit 8: 1. Exciting current control based on temperature distribution in the plate thickness direction of the weld zone, 2. Exciting current control based on weld shape, and 3. Exciting current control based on weld frequency fluctuation. These controls can be used independently to determine the frequency of the exciting current or can be used in various combinations to determine the frequency of the exciting current. Note that it is preferable, for example, to primarily use the exciting current control based on temperature distribution in the plate thickness direction of the weld zone, and to correct the value of the frequency based on the temperature distribution by auxiliary use of the exciting current control based on weld shape and/or the exciting current control based on weld frequency fluctuation. Note that the frequency is defined to be flexibly variable within a predefined frequency range, either continuously or discretely to a degree that can be deemed to simulate continuous variation (continuation of the heating control step).

In the foregoing explanation, the heating control unit 9 comprising the heating database 6, weld zone temperature rise calculation unit 7, and frequency determining unit 8 was described with regard to the case of a configuration for controlling the frequency of the exciting current. As other configurations, it is possible to incorporate, in addition to the frequency, the exciting current and/or voltage as parameters to be controlled by the heating control unit 9. In this case, the volume of the data processed by the heating control unit 9 increases, but the weld quality can be more dynamically regulated.

The variable frequency power supply 1 will be explained next. The variable frequency power supply 1 supplies exciting current to the heating electromagnetic coil 2 under control by the frequency determined by the frequency determining unit 8.

FIG. 5 is an example of the variable frequency power supply in this embodiment, whose frequency is continuously variable in a predetermined frequency range (e.g., 1 kHz to 500 kHz), and for which there can be used an "alternating current power supply that recovers magnetic energy" such as taught by Japanese Patent Publication (A) No. 2004-260991. Specifically, an alternating voltage from a line alternating current power source (weld zone primary power supply) 100 is sent through an alternating current reactor 101 to be rectified by a diode rectifier 102 so as to apply a direct current voltage to the variable frequency power supply 1, which recovers magnetic energy and serves as the variable frequency power supply.

When the switching elements S2, S4 of the variable frequency power supply 1 are turned OFF, current passes through the heating electromagnetic coil 2 from below to above in the drawing sheet and then passes through the diodes of S1 and S3 to charge the capacitor C. The current becomes 0 when charging of the capacitor C is completed.

Next, when the switching elements S1, S3 are turned ON (S2, S4 OFF) by the time the charging of the capacitor C is completed, the energy charged in the capacitor C is discharged through S1, S3, so that current passes through the heating electromagnetic coil 2 from above to below in the drawing sheet.

When discharge of the capacitor C is completed, the capacitor voltage becomes 0, the diodes of S2, S4 conduct because they are no longer under reverse voltage, and current through the heating electromagnetic coil 2 from above to below in the drawing sheet is increased by passage through the two paths of S4 to S1 and S3 to S2. During this period, since current circulates between the heating electromagnetic coil 2 and the variable frequency power supply 1, current is attenuated by the time constant determined by the heating electromagnetic coil 2 and the impedance of the steel pipe. Thereafter, when, similarly, S1 and S3 are turned OFF, and S2 and S4 are turned ON, the capacitor C is charged through S2 and S4, and when charging of the capacitor C is completed, the energy charged in the capacitor C is discharged through S4 and S2, so that current passes through the heating coil 2 from above to below in the drawing sheet.

It thus becomes possible to pass current of different frequencies through the heating electromagnetic coil 2 by regulating the ON/OFF timing of the respective S1/S3 and S2/S4 switching element gates, whereby frequency-variable induction heating can be realized. In other words, the frequency of the current passing through the heating electromagnetic coil 2 can be varied by the heating control unit 9 which regulates the conduction timing of the switching elements based on the signal from the welding condition measurement unit 5.

On the other hand, the current of the heating electromagnetic coil 2 is defined in advance by an output current setting unit 103 in accordance with the steel pipe size (diameter, thickness) and steel type (composition and structure), the amperage of the current passing through the heating electromagnetic coil 2 is fed back, and the voltage of a thyristor power regulator 104 is controlled to make the current passing through the heating electromagnetic coil 2 constant.

In this case, no matching transformer is necessary between the variable frequency power supply 1 and the heating electromagnetic coil 2 for matching the impedance between the material being heated and the heating electromagnetic coil, which improves the heating efficiency of the material being heated and is therefore desirable from the viewpoint of high-efficiency energy conservation. Further, in the case of weld zone induction heating of the steel pipe, it is possible to adopt power MOSFETs for the switching elements S1 to S4 because the frequency sometimes becomes as high as around 400 kHz (heating step).

Second Embodiment

Figure 2B:
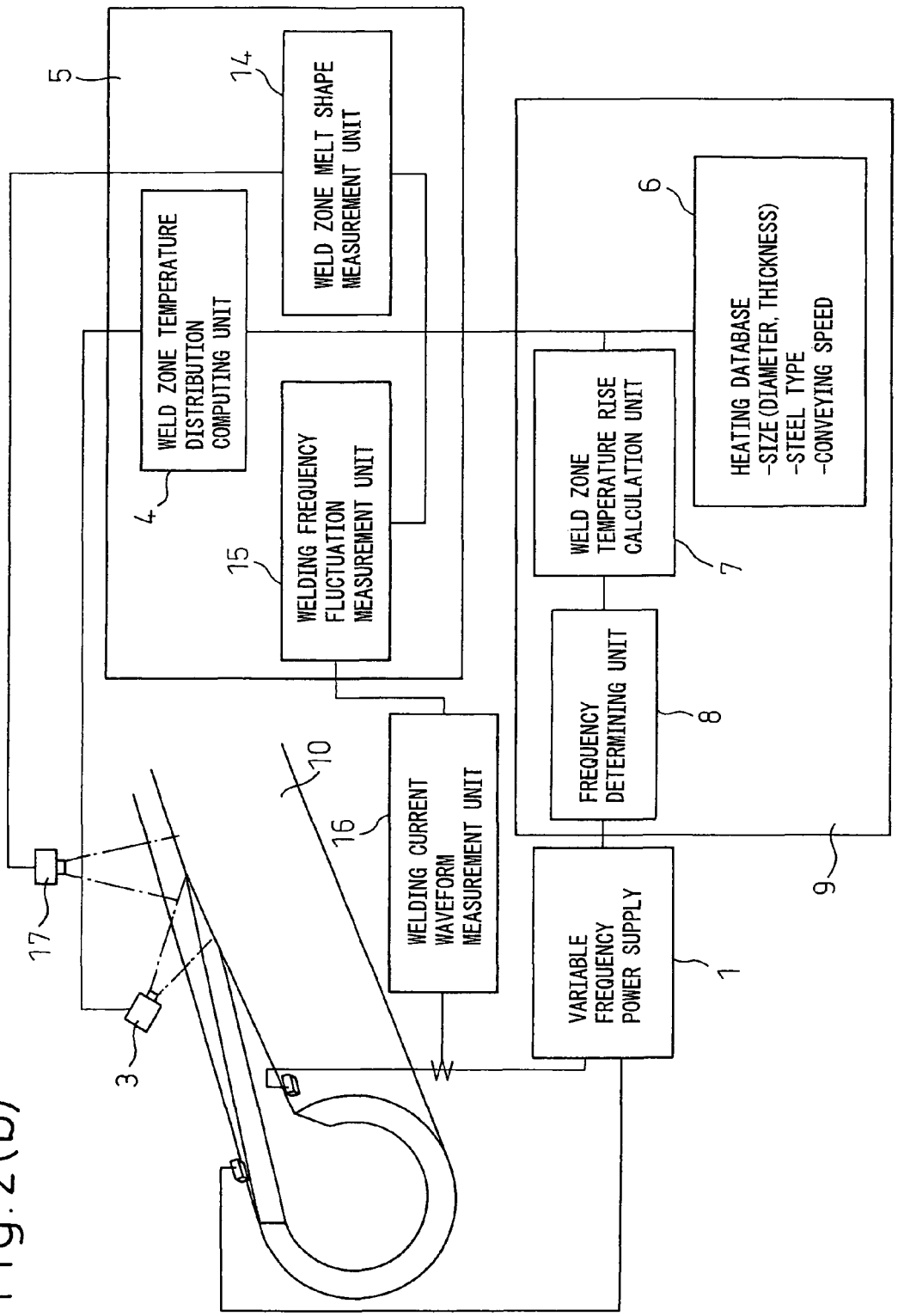
FIG. 2(b) is a schematic diagram of a direct electrical heating type steel pipe material weld zone induction-heating apparatus in a mode of carrying out the present invention.

Although in the first embodiment a configuration when using the weld zone induction heating electromagnetic coil shown in FIG. 2(*a*) was set out, as a second embodiment of the present invention a configuration is possible in which, as shown in FIG. 2(*b*), the welded steel pipe is heated by directly applying alternating current through a pair of weld zone direct electrical heating contacts 2' that are electrodes installed on opposite ends of the steel plate across the weld zone from each other. In this case, the frequency determining unit 8 controls the frequency of the current directly passed through the welded steel pipe. Also in this case, it is possible to control not only the frequency but also the voltage applied to the contacts.

Other Embodiments

The aforesaid welding condition measurement unit 5 comprising the weld zone temperature distribution computation unit 4, weld zone melt shape measurement unit 14, and welding frequency fluctuation measurement unit 15, and the heating control unit 9 comprising the heating database 6, weld zone temperature rise calculation unit 7, and frequency determining unit 8 are preferably configured, individually or together, using a personal computer equipped with, for example, an A/D converter board, HDD and other storage devices, keyboard, mouse and other input devices, and a display for outputting and displaying operations and processing results, and with a computer program for operating the same to execute the forgoing processing. In addition, it is possible to install a network connection unit to be connected to a LAN in the production plant for inputting production schedules and other operation data and notifying the operator when welding abnormality is detected.

Although preferred modes of carrying out the present invention where explained in detail with reference to the drawings in the foregoing, it goes without saying that the present invention is not limited to these examples. A person having ordinary knowledge in the field of technology to which the present invention belongs will obviously be able to conceive various changes and modifications within the scope of the technical idea set out in the claims, and it is understood that all such changes and modifications naturally fall within the technical scope of the present invention.

INDUSTRIAL APPLICABILITY

The steel pipe material weld zone heating method and apparatus of the present invention heat a material to be heated taking into account the diameter, thickness and other shape and material property values of the material to be heated; measure the temperature distribution in the plate thickness direction of the weld zone of the material to be heated, the melt shape of the weld zone, and the weld frequency fluctuation during welding; and heat the material to be heated while continuously or discretely changing/controlling the frequency based thereon, thereby making it possible to control the material to be heated to the desired temperature distribution, melt shape, and weld frequency fluctuation.

Moreover, a heating method can be provided that is capable of controlling the temperature distribution, melt shape and weld frequency fluctuation uniformly throughout the entire length of the weld zone of the steel pipe material, so that application as a measure for improving product yield and enhancing productivity during steel pipe production is possible. In addition, since a heating method that is not dependent on the diameter, thickness or steel type of the material to be heated can be provided, quality can be built in by optimizing the temperature distribution in the plate thickness direction of the steel pipe weld zone, the melt shape of the weld zone, and the weld frequency fluctuation during welding, thus contributing greatly toward realizing higher performance steel pipe products and the like.

The invention claimed is:

1. A steel pipe weld zone heating apparatus for making a tubular steel pipe by bending a moving steel plate into cylindrical shape, the apparatus comprising:
a variable frequency alternating current power supply, having a frequency variable within a predetermined frequency range, configured to generate joule heat by passing alternating current near end faces of the bent steel plate, and continuously melt and pressure-weld a weld zone of the bent steel plate, forming the steel pipe,
a first imaging unit installed opposite an end face weld zone of the bent steel plate that detects self-emitted light of the weld zone, and outputs a brightness image;
a weld zone temperature distribution computation unit that performs image processing based on the brightness image, and applies emitted light temperature measurement to compute the plate-thickness temperature distribution of the weld zone; and
a heating control unit configured to use criteria predefined from dimensions and electromagnetic properties of the bent steel plate to evaluate a relationship between the alternating current frequency and a plate-thickness temperature distribution, and to determine the frequency of the alternating current based on the plate-thickness temperature distribution; wherein the variable frequency alternating current power supply is configured to pass alternating current of the frequency determined by the heating control unit through the bent steel plate.

2. The steel pipe weld zone heating apparatus according to claim 1, further comprising:
a second imaging unit configured to image the weld zone from above, and provide a plane image of the molten steel material immediately after pressure-welding the steel pipe; and
a weld zone melt shape measurement unit configured to ascertain the melt shape, based on the plane image, and provide a molten zone width value,
wherein the heating control unit is configured to use predefined criteria to evaluate the molten zone width and the criteria for evaluating the relationship between the alternating current frequency and the plate-thickness direction temperature distribution to determine the frequency of the alternating current based on the molten zone width value and the plate-thickness temperature distribution.

3. The steel pipe weld zone heating apparatus according to claim 1, further comprising:
a welding current waveform measurement unit configured to measure a current waveform of the alternating current; and
a welding frequency fluctuation measurement unit that, based on a current waveform output by the welding current waveform measurement unit, ascertains and outputs a welding frequency time-dependent fluctuation value that is a time-dependent fluctuation amplitude of the current waveform frequency,
wherein the heating control unit is further configured to compare the welding frequency time-dependent fluctuation value with a predetermined allowable value, and determine the frequency of the alternating current.

4. The steel pipe weld zone heating apparatus according to claim 1, further comprising:
a heating electromagnetic coil that is installed in the outer circumferential direction of the steel pipe substantially coaxial with the steel pipe, and is supplied with exciting current from the variable frequency alternating current power supply to induce alternating current in the steel pipe, and heat the pipe.

5. The steel pipe weld zone heating apparatus according to claim 4, wherein the heating control unit is configured to determine the frequency and current value of the exciting current of the heating electromagnetic coil, and control the variable frequency alternating current power supply.

6. The steel pipe weld zone heating apparatus according to claim 1, further comprising:
a pair of direct electrical heating contacts installed on opposite ends of the steel plate across the weld zone from each other as electrodes configured to apply alternating current from the alternating current power supply.

7. The steel pipe weld zone heating apparatus according to claim 6, wherein the heating control unit is configured to determine the frequency and current value of the alternating current supplied to the direct electrical heating contacts, and control the variable frequency alternating current power supply.

8. The steel pipe weld zone heating apparatus according to claim 1, wherein the variable frequency alternating current power supply is a magnetic energy recovery alternating current power supply.

9. A method for heating a steel pipe weld zone, comprising:
bending a moving steel plate into a cylindrical shape,
joule heating near end faces of the bent steel plate using a variable frequency alternating current that is variable within a predetermined frequency range, thereby continuously melting and pressure-welding a weld zone of the bent steel plate,
in a first imaging step, detecting self-emitted light from the weld zone, and providing a brightness image;
in a weld zone temperature distribution computation step, processing the image based on the brightness image and an emitted light temperature measurement to compute a plate-thickness temperature distribution of the weld zone;
in a heating control step, based on criteria predefined from the dimensions and electromagnetic properties of the bent steel plate, evaluating a relationship between the alternating current frequency and the plate-thickness temperature distribution to determine the frequency of the alternating current based on the plate-thickness direction temperature distribution; and
passing the variable frequency alternating current through the bent steel plate at the frequency determined in the heating control step.

10. The weld zone heating method according to claim 9, further comprising:
in a second imaging step, imaging the weld zone from above, providing a plane image of molten steel material immediately after pressure-welding the bent steel plate; and
in a weld zone melt shape measurement step, ascertaining the melt shape based on the plane image, providing a molten zone width value,
wherein, in the heating control step, based on predefined criteria for evaluating the molten zone width and criteria for evaluating the relationship between the alternating current frequency and the plate-thickness temperature distribution, determining the frequency of the alternating current based on the molten zone width value and the plate-thickness temperature distribution.

11. The weld zone heating method according to claim 9, further comprising:

in a welding current waveform measurement step, measuring the current waveform of the alternating current; and in a welding frequency fluctuation measurement step, based on the current waveform measurement, ascertaining and outputting a welding frequency time-dependent fluctuation value that is the time-dependent fluctuation amplitude of the current waveform frequency, and in the heating control step, comparing the welding frequency time-dependent fluctuation value with a predetermined allowable value, and determining the frequency of the alternating current.

12. The weld zone heating method according to claim 9, further comprising, supplying exciting current from the variable frequency alternating current power supply to a heating electromagnetic coil installed in the outer circumferential direction of the bent steel plate to be substantially coaxial with the steel pipe, thereby heating the bent steel plate by inducing the alternating current in the bent steel plate, or heating the bent steel plate by passing the alternating current through the bent steel plate using direct electrical heating contacts installed on opposite ends of the steel plate across the weld zone from each other for applying alternating current from the alternating current power supply.

13. The weld zone heating method according to claim 12, further comprising, in the heating control step, determining the frequency and current value of the exciting current of the heating electromagnetic coil, and controlling the variable frequency alternating current power supply, or determining the frequency and current value of the alternating current supplied to the direct electrical heating contacts, and controlling the variable frequency alternating current power supply.

14. The weld zone heating method according to claim 9, wherein the variable frequency alternating current power supply is a magnetic energy recovery alternating current power supply.

15. A steel pipe produced with a steel pipe weld zone heating apparatus, the steel pipe weld zone heating apparatus comprising:

a variable frequency alternating current power supply, having a frequency variable within a predetermined frequency range, configured to generate joule heat by passing alternating current near end faces of the bent steel plate, and continuously melt and pressure-weld a weld zone of the bent steel plate, forming the steel pipe, a first imaging unit installed opposite an end face weld zone of the bent steel plate that detects self-emitted light of the weld zone, and outputs a brightness image;

a weld zone temperature distribution computation unit that performs image processing based on the brightness image, and applies emitted light temperature measurement to compute the plate-thickness temperature distribution of the weld zone; and a heating control unit configured to use criteria predefined from dimensions and electromagnetic properties of the bent steel plate to evaluate a relationship between the alternating current frequency and a plate-thickness temperature distribution, and to determine the frequency of the alternating current based on the plate-thickness temperature distribution; wherein the variable frequency alternating current power supply is configured to pass alternating current of the frequency determined by the heating control unit through the bent steel plate.

16. A steel pipe produced by a steel pipe weld zone heating method, the method comprising:

bending a moving steel plate into a cylindrical shape, joule heating near end faces of the bent steel plate using a variable frequency alternating current that is variable within a predetermined frequency range, thereby continuously melting and pressure-welding a weld zone of the bent steel plate, in a first imaging step, detecting self-emitted light from the weld zone, and providing a brightness image;

in a weld zone temperature distribution computation step, processing the image based on the brightness image and an emitted light temperature measurement to compute a plate-thickness temperature distribution of the weld zone;

in a heating control step, based on criteria predefined from the dimensions and electromagnetic properties of the bent steel plate, evaluating a relationship between the alternating current frequency and the plate-thickness temperature distribution to determine the frequency of the alternating current based on the plate-thickness direction temperature distribution; and passing the variable frequency alternating current through the bent steel plate at the frequency determined in the heating control step.

* * * * *

UNITED STATES PATENT AND TRADEMARK OFFICE
CERTIFICATE OF CORRECTION

PATENT NO. : 8,383,978 B2
APPLICATION NO. : 12/734442
DATED : February 26, 2013
INVENTOR(S) : Kazuhiko Fukutani et al.

It is certified that error appears in the above-identified patent and that said Letters Patent is hereby corrected as shown below:

In the Specification

Column 1, line 54, change "penetration depth 6" to -- penetration depth $\delta$ --;

Column 1, line 57, change "material, relative" to -- material, $\mu\gamma$: relative --;

Column 7, line 3, change "heating method" to -- heating method. --;

Column 10, equation <3>, change " $J = \frac{1}{n} x \sum_{m=0}^{n} [DT(Pm, f) - T(Pm, f)]^2$ " to -- $J = \frac{1}{n} x \sum_{m=0}^{n} [DT(Pm, f) - T(Pm, f)]^2$ --.

Signed and Sealed this
Third Day of December, 2013

Margaret A. Focarino
*Commissioner for Patents of the United States Patent and Trademark Office*